US006143388A

United States Patent [19]

Bian et al.

[11] Patent Number: 6,143,388

[45] Date of Patent: Nov. 7, 2000

[54] THIN FILM DISK WITH ONSET LAYER

[75] Inventors: Xiaoping Bian, San Jose; Mary Frances Doerner, Santa Cruz; Shanlin Duan, Fremont; Jinshan Li, Newark; Mohammad Taghi Mirzamaani, San Jose, all of Calif.

[73] Assignee: International Business Machines Corporation, Armonk, N.Y.

[21] Appl. No.: 08/976,565

[22] Filed: Nov. 24, 1997

[51] Int. Cl.[7] .......... G11B 5/66

[52] U.S. Cl. .......... 428/65.3; 428/65.7; 428/336; 428/694 T; 428/694 TS; 428/694 TM; 428/900; 360/128

[58] Field of Search .......... 428/694 T, 694 TS, 428/694 TM, 900, 65.3, 65.7, 336; 360/128

[56] References Cited

U.S. PATENT DOCUMENTS

| | | | |
|---|---|---|---|
| 4,654,276 | 3/1987 | Ahlert | 428/641 |
| 4,677,032 | 6/1987 | Robinson | 428/611 |
| 4,749,628 | 6/1988 | Ahlert | 428/660 |
| 4,810,592 | 3/1989 | Miyabayashi | 428/668 |
| 5,587,235 | 12/1996 | Suzuki et al. | 428/332 |
| 5,605,733 | 2/1997 | Ishikawa et al. | 428/65.3 |
| 5,693,426 | 12/1997 | Lee | 428/611 |
| 5,736,262 | 4/1998 | Ohkijima et al. | 428/611 |
| 5,766,727 | 6/1998 | Moroishi | 428/141 |
| 5,820,963 | 10/1998 | Lu et al. | 428/65.3 |
| 5,851,643 | 12/1998 | Honda et al. | 428/212 |

FOREIGN PATENT DOCUMENTS

| | | |
|---|---|---|
| 63-48611 | 3/1988 | Japan . |
| 10-79307 | 3/1998 | Japan . |

*Primary Examiner*—Leszek Kiliman
*Attorney, Agent, or Firm*—G. Marlin Knight

[57] ABSTRACT

A thin film disk and a disk drive using the thin film disk are described. The disk has an onset layer between the underlayer and the boron containing magnetic layer, for example. The onset layer of the invention is useful because the boron containing magnetic layer material resists being deposited with the C-axis in plane. The onset layer material is selected to promote an in-plane C-axis orientation. When a boron containing magnetic layer is deposited on the onset layer the resulting in-plane PO is improved. The preferred onset layer is of hexagonal closed pack structured material which may be magnetic or nonmagnetic. Materials which are usable for the onset layer include a wide range of pure elements and cobalt alloys such as CoCr, CoPtCr, CoPtCrTa and CoCrB. The onset layer is particularly useful in allowing a ferromagnetic cobalt (Co) alloy containing a relatively high chromium and boron content to be deposited on nonmetallic substrates with the C-axis in the plane of disk without the need for negative bias during the sputtering of the underlayer.

23 Claims, 1 Drawing Sheet

16 overcoat
15 magnetic layer
14 onset layer
13 underlayer
12 seed layer
11 substrate

THIN FILM DISK WITH ONSET LAYER

FIELD OF THE INVENTION

This invention relates to the field of data storage devices such as disk drives having thin film magnetic disks. More particularly the invention relates to thin film magnetic disks having an onset layer under the magnetic layer to improve the crystallographic structure and recording characteristics of the magnetic layer.

BACKGROUND OF THE INVENTION

The thin film magnetic recording disk in a conventional drive assembly typically consists of a substrate, an underlayer consisting of a thin film of chromium (Cr) or a Cr alloy, a cobalt-based ferromagnetic alloy deposited on the underlayer, and a protective overcoat over the ferromagnetic layer. The word "magnetic" will be used herein as a synonym for "ferromagnetic." A variety of disk substrates such as NiP-coated AlMg, glass, glass ceramic, glassy carbon, etc., have been used. The microstructural parameters of the magnetic layer, i.e., crystallographic preferred orientation (PO), grain size and magnetic exchange decoupling between the grains, play key roles in controlling the recording characteristics of the disk. The Cr underlayer is mainly used to control such microstructural parameters as the PO and grain size of the cobalt-based magnetic alloy.

The PO of the various materials forming the layers on the disk, as discussed below, is not necessarily an exclusive orientation which may be found in the material, but is merely the most prominent orientation. When the Cr underlayer is sputter deposited at a sufficiently elevated temperature on a NiP-coated AlMg substrate a [100] PO is usually formed. This PO promotes the epitaxial growth of $[11\bar{2}0]$ PO of the hexagonal close-packed (hcp) cobalt (Co) alloy, and thereby improves the in-plane magnetic performance of the disk. The $[11\bar{2}0]$ PO refers to a film of hexagonal structure whose $(11\bar{2}0)$ planes are predominantly parallel to the surface of the film. (Likewise the $[10\bar{1}0]$ PO refers to a film of hexagonal structure whose $(10\bar{1}0)$ planes are predominantly parallel to the surface of the film).

Nucleation and growth of Cr or Cr alloy underlayers on glass and most non-metallic substrates differ significantly from NiP-coated AlMg substrates (AlMg/NiP).

Magnetic films fabricated on glass substrates are often noisier than films on AlMg/NiP substrates under otherwise identical deposition conditions. It is for this reason that magnetic media on non-metallic substrates are structured differently than on AlMg/NiP substrates. "Glass" will be used herein for convenience to refer to the entire class of non-metallic substrates unless otherwise noted. Glass substrate disks, for example, benefit from the use of an initial layer called the seed layer. The seed layer is formed on the glass substrate beneath the underlayer in order to control nucleation and growth of the underlayer which in turn affects the magnetic layer. Various materials have been proposed for seed layers such as: Al, Cr, $Ni_3P$, Ta, C, W, FeAl and NiAl on non-metallic substrates. Laughlin, et al., have described use of an NiAl seed layer followed by a 2.5 nm thick Cr underlayer and a CoCrPt magnetic layer. The NiAl seed layer with the Cr underlayer was said to induce the $[10\bar{1}0]$ texture in the magnetic layer. (See "The Control and Characterization of the Crystallographic Texture of Longitudinal Thin Film Recording Media," IEEE Trans. Magnetic. 32(5) September 1996, p.3632).

Various designs of thin film disks with laminated magnetic layers are known. The typical laminated magnetic layers are cobalt alloys separated by a thin layer of nonmagnetic material such as Cr or Cr alloy. The multiple magnetic layers in laminated disks are all typically composed of the same alloy.

Since longitudinal recording requires that the C-axis be sufficiently oriented in the plane of the substrate, the range of thin film structures which might otherwise be used is restricted. For example, CoPtCrB (quaternary boron or QB) alloys with high chromium content have a tendency to orient with the C-axis vertical to the plane of the substrate. Some QB alloys have certain advantages as described in U.S. Pat. No. 5,523,173, so it is useful to find ways to overcome the PO problem.

The '173 patent describes special sputtering conditions which are useful in depositing QB on an AlMg/NiP substrate to pull the C-axis more strongly into the plane of the substrate. The desired orientation of the QB in the '173 patent is $[11\bar{2}0]$ PO in which the C-axis is sufficiently in the plane of the substrate for longitudinal recording. One of the conditions in the '173 method is 300 volts of negative bias on the substrate during sputtering of the Cr underlayer. Unfortunately, the '173 negative bias technique is impractical when glass substrates are used due to the electrically insulating nature of glass. Therefore, use of QB on glass substrates to obtain the advantages thereof in an efficient manufacturing process, requires a novel approach.

SUMMARY OF INVENTION

The invention is a thin film disk (and a disk drive using the thin film disk), which has an onset layer between the underlayer and the magnetic layer. The onset layer of the invention is useful when the magnetic layer material resists being deposited with the C-axis in plane, e.g. certain cobalt/boron alloys. The onset layer material is selected to promote a stronger in plane C-axis orientation in the magnetic layer. When certain types of magnetic layers are deposited on the onset layer the resulting in plane PO is improved. One factor in selecting a material for the onset layer is the lattice match with the underlayer. Lattice parameters which are intermediate between that of the underlayer and the magnetic layer may strengthen the epitaxy in the desired orientation. Other factors such as surface energies may also be significant in the epitaxy. The preferred onset layer is of hexagonal close packed structured material which may be magnetic or nonmagnetic. Materials which are usable for the onset layer include a wide range of cobalt alloys such as CoCr, CoPtCr and CoPtCrTa. The PO of the magnetic layer will be the same as the PO of the onset layer if the onset layer has a hexagonal structure, e.g. either $[10\bar{1}0]$ or $[11\bar{2}0]$ PO as determined by the epitaxial conditions. The substrate may be metallic or nonmetallic, but superior results have been obtained with nonmetallic substrates, e.g. glass.

An onset layer is particularly useful in allowing a ferromagnetic cobalt (Co) alloy containing a relatively high chromium and boron content to be deposited with the C-axis in the plane of disk without the need for negative bias during the sputtering of the underlayer. Obviating the bias requirement allows the boron containing magnetic layer to be used on nonconducting substrates such as glass for which the use of bias is problematic. One exemplary embodiment selected from among the large number of possible embodiments uses a glass substrate, a NiAl seed layer, a chromium or chromium alloy underlayer, a CoPtCrTa onset layer and CoPtCrB as the magnetic layer.

DETAILED DESCRIPTION OF THE PREFERRED EMBODIMENTS

Figure 2:
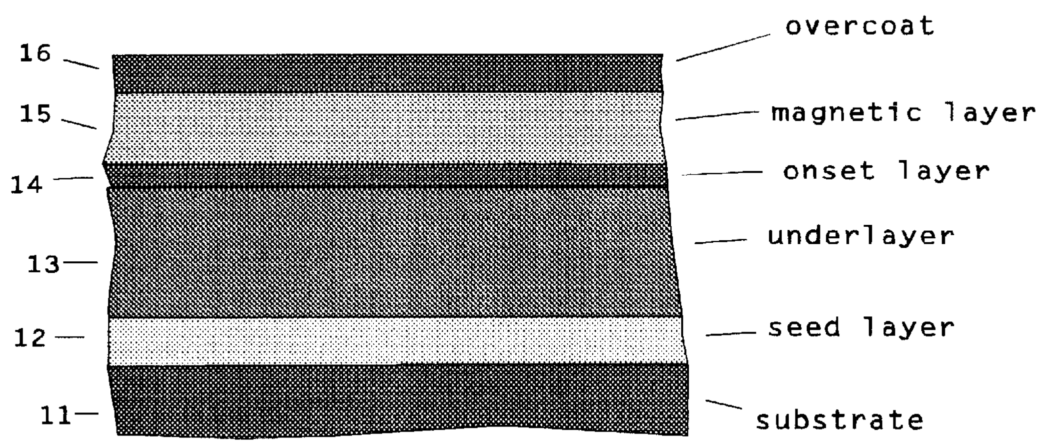
FIG. 2 illustrates the layer structure of a thin film magnetic disk embodying the invention on nonmetallic substrate.

FIG. 2 illustrates the cross sectional layer structure of an embodiment of the invention in a thin film magnetic disk using a nonmetallic substrate. The thin film layers will be sputter deposited onto at least one and preferably both planar surfaces of the disk to form the data recording area. The shading is used only to differentiate the layers and not to indicate color or specific composition. Although the invention may be used with substrates made of AlMg/NiP, glass or any other suitable material, the following will initially be directed to the glass, i.e. nonmetallic, substrate embodiment unless otherwise noted. The metallic substrate case will be distinguished later. The substrate 11 is a nonmetallic material such as glass. The seed layer 12 is deposited directly onto the substrate and may be any one of the materials which are known in the prior art to be useful as seed materials. For example, NiAl is particularly useful as a seed layer on glass and by inference FeAl which has a similar size and structure to NiAl, would also be expected to work well as a seed layer. A NiAl type seed layer preferably has a [211] PO, but in practice it is to be expected that the seed layer may have a mixed PO of [211] and other orientations such as [110].

The underlayer 13 is deposited onto the seed layer and is conventionally a nonmagnetic material such as chromium or a chromium alloy. The PO of the underlayer is influenced by the seed layer. When NiAl is the seed layer, the underlayer has a PO of [211] possibly mixed with some [110] orientations. The [211] PO ultimately promotes the $[10\bar{1}0]$ PO in the magnetic layer. (Note that the $[10\bar{1}0]$ PO design goal in this case for the nonmetallic substrate disks is in contrast to the $[11\bar{2}0]$ PO goal for conventional AlMg/NiP substrates for longitudinal recording.)

The onset layer 14 can be a magnetic or nonmagnetic material with an hcp structure or any other structure which promotes the in plane C-axis in the magnetic layer. It may conveniently be a magnetic alloy of cobalt of the type used for thin film magnetic layers which typically contains platinum and/or chromium and may contain additional elements such as boron and tantalum, e.g. CoCrTa, CoPtCrTa, CoCrB and CoPtCrB. Since a wide range of magnetic cobalt alloys have been studied and used on thin film disks, there is substantial knowledge available on the PO's, lattice parameters, etc. for these films. Many magnetic alloys are known to be hcp and to be relatively easily deposited on a properly oriented underlayer so that the C-axis is strongly in the plane of the disk surface, i.e. $[10\bar{1}0]$ or $[11\bar{2}0]$ PO. As a specific example, a magnetic onset layer of CoPtCrTa might comprise 4 to 14 at. % platinum, 10 to 23 at. % chromium and 1 to 5 at. % tantalum with the rest being Co. Other commonly used hcp magnetic materials which could be used for the onset layer include CoPtCr, CoNiCr, CoCrTa, etc. Nonmagnetic materials such as CoCr (Cr>30 at. %), Cr alloys, etc. can also be used as onset layers.

The invention uses the onset layer to promote a preferred hcp growth pattern with the C-axis more strongly in the plane than would occur if the magnetic layer material is deposited directly onto the underlayer. The improved epitaxy results by presenting the magnetic layer material with a more favorable material on which its crystals can grow. One factor in creating favorable epitaxial conditions is the lattice match. The lattice of Cr based underlayers is well matched to the lattice of many of the Co alloys. If there is a relatively large mismatch between the lattice parameters of the underlayer and that of the desired magnetic layer material, then an onset layer which has a lattice match which is intermediate between that of the underlayer and the magnetic layer may improve the epitaxy so that the C-axis in the magnetic layer is more in plane. By dividing the mismatch in effect between two interfaces, the stresses at each of the interfaces may be lessened. Lattice matching alone is, however, not the only factor. Although the phenomena are not completely understood, it is known that surface energies play a role. Thus, materials which would appear to have a good lattice match may not behave well epitaxially. For this reason, some trial and error in matching new materials is known to be necessary by those skilled in the art.

The onset layer does not have to be magnetic to function according to the invention. For example, a nonmagnetic CoCr alloy, i.e. greater than 30 at. % Cr, with an hcp structure can also be used. The goal of promoting the hcp growth pattern with the C-axis strongly in the plane is independent of whether the onset layer is magnetic or nonmagnetic. This widens the variety of materials with the hcp structure which could be expected to function correctly as an onset layer.

When Pt, Ta, B, etc. are added to a Co alloy, the lattice parameters increase and surface energies may change. There can be design tradeoffs between potential improvements from relatively large amounts of the additives (e.g. 10% B) versus degradation due to decreased epitaxy. Although additives such as Ti and V are known to increase the lattice parameters of a Cr alloy underlayer, this approach does not provide a complete solution. The onset layer is used to provide an intermediate interface between the underlayer and the magnetic layer to allow the epitaxy to continue in the desired orientation.

The thicknesses of the standard seed, underlayer and magnetic layers are not believed to be critical for practicing the invention and can be determined according to prior art principles. Therefore, the thickness ranges given below are merely included as illustrative guidance. Typical thickness ranges currently in use are: seed layer between 2 and 50 nm, underlayer between 10 and 80 nm and magnetic layer between 5 and 50 nm. Wide variations in the thickness of the underlayer result in only small changes in the magnetic characteristics of the disk. A typical value for the thickness of the underlayer is about 50 nm.

The onset layer is preferably thinner than either the underlayer or the magnetic layer. In the glass/NiAl/Cr/CoPtCrTa/CoPtCrB embodiment the onset layer was found to be effective when 1.5 to 7.0 nm in thickness with 2.0 to 5.0 nm being preferred. The efficacy of the onset layer declines if the thickness is either too high or too low. If the onset layer is too thin it will not foster the desired PO and microstructure in the CoPtCrB layer. If it is too thick the benefit of lower noise with CoPtCrB is lost. With a typical magnetic layer thickness of about 5 to 25 nm, the ratio of the thickness of the onset layer to the thickness of the magnetic layer was from about 0.33 to 0.08. Other embodiments can be expected to have a different critical range of thicknesses, but the range can easily be determined empirically.

The onset layer of the invention is particularly useful for a glass substrate with a magnetic layer 15 which is a magnetic cobalt alloy which contains boron. As noted the QB alloy is somewhat prone to orient with the C-axis perpendicular to the plane of the disk. The onset layer technique could similarly be used with other alloys that resist being deposited with the C-axis in the plane. As an example, the quaternary boron (QB) alloy described in the U.S. Pat. No. 5,523,173 can be used as the magnetic layer. The QB alloy is given in the '173 patent as comprising 4 to 12 at. % platinum, 10 to 23 at. % chromium and 2 to 10 at. % boron with the rest being Co. An example of a complete layer structure of a disk embodying the invention would be:

glass—NiAl—Cr—CoPtCrTa (onset layer)—CoPtCrB—overcoat.

The use of the onset layer according to the invention allows the benefits of the QB alloy to be obtained more easily on nonconductive substrates, since it obviates the need to use bias during the underlayer deposition process.

In a copending and commonly assigned U.S. patent application Ser. No. 08/838,376 filed on Apr. 8, 1997 now pending, an alternative method of using QB on a glass substrate is described. As described in that application a seed layer consisting of tantalum (Ta) is deposited on substrate materials which can include glass, followed by a suitable underlayer such as CrTi, a CoPtCrB magnetic layer and an optional overcoat. The underlayer is preferably a Cr alloy such as CrTi with a grain size which is smaller than that of pure Cr. The onset layer as described in the present application can be used in conjunction with the Ta or Ta alloy seed layer, for example, as glass—Ta—CrTi—CoPtCrTa—CoPtCrB—overcoat.

The target PO's in this structure will be:

Ta—[100] CrTi—$[11\bar{2}0]$ CoPtCrTa—$[11\bar{2}0]$ CoPtCrB which are in contrast to the PO's described above for the NiAl seed layer disk. The seed layer may also be CrTi.

Even though bias is relatively easily applied on metallic substrates as described in U.S. Pat. No. 5,523,173, the onset layer may still be useful for metallic substrates (e.g. AlMg/NiP) with QB or some other magnetic material, by either pulling the C-axis more strongly in plane and/or allowing the process to be simplified by eliminating the bias requirement. As noted above the PO's for longitudinal recording for typical layers on AlMg/NiP substrates are [100] for the Cr underlayer and $[11\bar{2}0]$ in the PO of the magnetic layer. Therefore, an hcp onset layer will be deposited as $[11\bar{2}0]$ and then the magnetic layer will epitaxially follow as $[11\bar{2}0]$. A disk embodying the invention could be structured as: AlMg/NiP substrate, Cr underlayer, CoPtCrTa onset layer, CoPtCrB magnetic layer and a protective overcoat.

Although seed layers have not typically been used on AlMg/NiP substrates, it is possible and sometimes desirable to do so. Copending and commonly assigned U.S. patent application Ser. No. 08/892,724 filed on Jul. 15, 1997 now U.S. Pat. No. 6,077,586, describes the use of a NiAl seed layer on substrates which include AlMg/NiP and on disks with multiple laminated magnetic layers. The onset layer is not limited to any particular type of disk structure and may be used on metal disks with seed layers and in laminated magnetic layer disks.

The use, composition and thickness of the overcoat 16 are not critical in practicing the invention, but by way of an example a typical thin film disk might use an overcoat of carbon optionally doped with hydrogen and/or nitrogen. The overcoat is typically less than 15 nm thick.

All of the layers described above from the seed layer to the overcoat can be sputtered in a continuous process in either an in-line sputtering system or a single disk system. There are also commercially available single disk systems with 6 or more target capacity with the capability to fabricate disks with an onset layer according to the invention. Starting with a substrate which can be AlMg/NiP, glass or any other suitable material, the layers are sequentially sputter deposited. The seed layer is deposited first for nonmetallic substrates, followed by the underlayer, then the onset layer, then the magnetic layer. The optional last step deposits a protective overcoat. The sputter deposition of each of the layers can be accomplished using standard targets and techniques known to those in the field.

While the compositions listed above have been given without regard to contamination percentages, it is known to those skilled in the art that some contamination is normally if not always present in thin films. Sputtering targets are typically specified as 99.9% or greater purity, but the resulting films may have much lower purity due to contamination in the sputtering chamber or other factors. For example, contamination by air in the chambers might result in measurable amounts of oxygen and/or hydrogen being incorporated into the film. For some carbon films 5 at. % hydrogen contamination has been measured in a typical sputtered layer. It is also known that some small amount of oxygen is normally found in Cr targets and in the resulting Cr layer. It is also possible for significant amounts of the working gas in the sputtering system, e.g. argon, to be incorporated into a sputtered film. Contamination levels were not specifically measured in the disk samples described and, therefore, were assumed to be within normal ranges for sputtered thin film disks expected by those skilled in the art.

The thin film disk made according to the invention can be used for storing data in typical disk drives using either magnetoresistive or inductive heads and can be used in contact recording or with flyable heads. The read/write head is positioned over the rotating disk in the standard manner to either record or read magnetic information.

Figure 1:
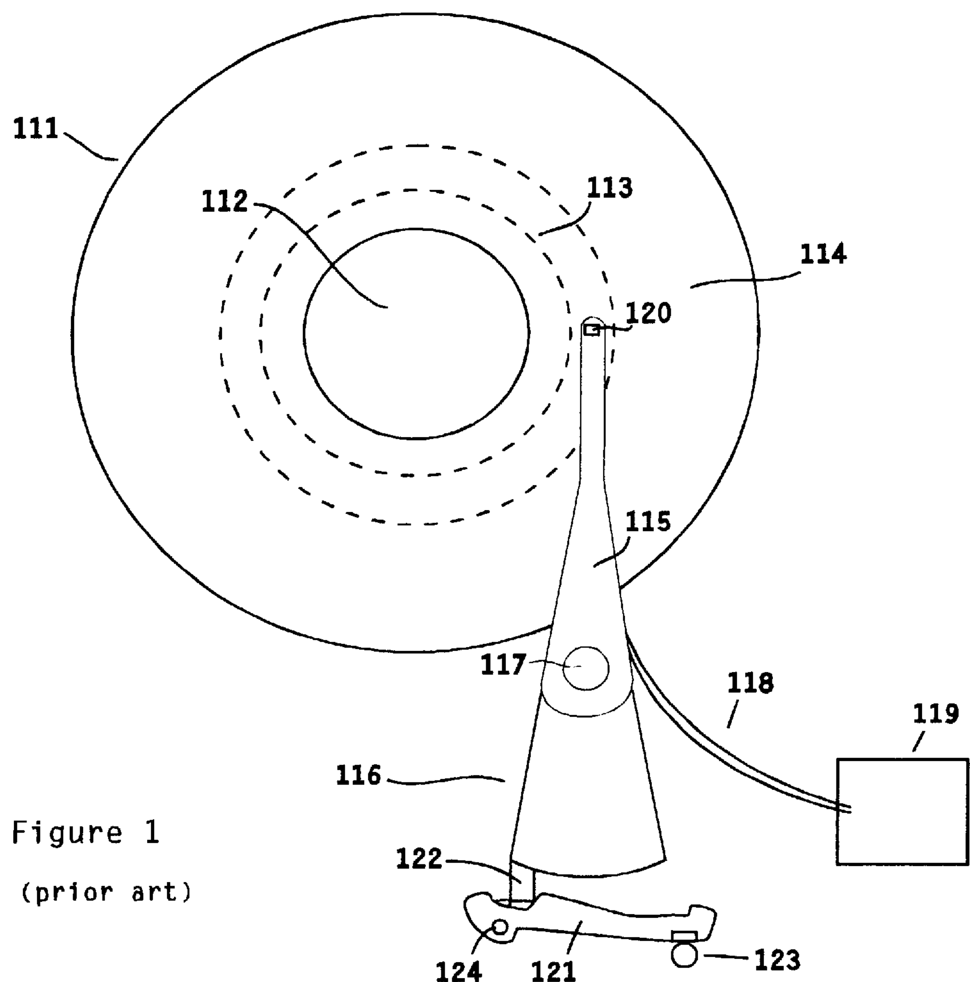
FIG. 1 illustrates a top view of a prior art disk drive with a rotary actuator useful in practicing the present invention.

FIG. 1 is a top view illustrating a prior art disk drive with a rotary actuator useful in practicing the present invention. The system comprises one or more magnetic recording disks 111 mounted on spindle 112 which is rotated by an in-hub electrical motor (not shown). An actuator assembly 115 supports a slider 120 which contains one or more read/write heads. The assembly may be composed of a plurality of actuators and sliders arranged in a vertical stack with the actuators supporting the sliders in contact with the surfaces of the disks when the disks are not rotating or being unloaded to avoid contact. A voice coil motor (VCM) 116 moves the actuator assembly 115 relative to the disks by causing the assembly to pivot around shaft 117. The heads are typically contained in air bearing sliders adapted for flying above the surface of the disks when rotating at sufficient speed. In operation, when the sliders are flying above the disks the VCM moves the sliders in an arcuate path across the disks allowing the heads to be positioned to read and write magnetic information from circular tracks formed in the data area 114 which is coated with the thin films which will be described in more detail below. Electrical signals to and from the heads and the VCM are carried by a flex cable 118 to the drive electronics 119. When not operating and during periods when the rotation of the disks is either starting or stopping, the sliders may be positioned in physical contact with the surface of the disks in a landing zone or contact start/stop (CSS) area 113 which is not used for data storage even though the magnetic coating extends over this area. It is also known to remove the sliders from the disks during nonoperating periods using an unload ramp. Although the disk drive has been described with air bearing sliders the disk of the present invention may easily be used in other storage devices having near contact, or contact recording sliders.

While the preferred embodiments of the present invention have been illustrated in detail, it will be apparent to the one skilled in the art that alternative embodiments of the invention are realizable without deviating from the scope and spirit of the invention.

What is claimed is:

1. A thin film magnetic disk comprising:

a seed layer including CrTi, Ta, NiAl or FeAl;

a nonmagnetic underlayer of a first material with a cubic crystal structure deposited on the seed layer;

an ferromagnetic onset layer of a second material with an hexagonal closed packed (hcp) crystal structure deposited on the nonmagnetic underlayer; and a ferromagnetic layer of a third material, with hexagonal closed packed (hcp) crystal structure, and which includes cobalt and boron, deposited on the onset layer.

2. The disk of claim 1 wherein the first material includes chromium; the second material is an alloy of cobalt with from 4 to 14 at. % platinum, from 10 to 23 at. % chromium, and from 1 to 5 at. % tantalum and the third material includes platinum and chromium.

3. The disk of claim 1 wherein the ferromagnetic layer is either $[10\bar{1}0]$ or $[11\bar{2}0]$ preferred orientation.

4. The disk of claim 1 wherein the onset layer is from 1.5 to 7.0 nm in thickness.

5. The disk of claim 1 wherein the third material further includes chromium and platinum and from 2 to 10 at. % boron.

6. The disk of claim 5 wherein the third material further comprises 4 to 12 at. % platinum, 10 to 23 at. % chromium and 2 to 10 at. % boron with the rest being cobalt.

7. The disk of claim 1 wherein the second material includes cobalt, chromium and tantalum and the third material further includes chromium, and platinum.

8. The disk of claim 1 further comprising a nonmetallic substrate.

9. The disk of claim 8 wherein the seed layer comprises NiAl, the first material includes chromium, the second material is a ferromagnetic alloy of cobalt and tantalum, and the third material further includes chromium, boron and platinum.

10. The disk of claim 1 wherein a thickness of the onset layer is less than 33% of a thickness of the ferromagnetic layer.

11. The disk of claim 1 further comprising a nonmetallic substrate and a seed layer deposited on the substrate with the seed layer being beneath the underlayer; and wherein:

the seed layer comprises NiAl or FeAl or Ta;

the first material includes chromium;

the second material includes cobalt and chromium;

the third material comprises 4 to 12 at. % platinum, 10 to 23 at. % chromium and 2 to 10 at. % boron with the rest being cobalt;

the onset layer and the ferromagnetic layer have a $[10\bar{1}0]$ preferred orientation; and a thickness of the onset layer is less than 33% of a thickness of the ferromagnetic layer.

12. The disk of claim 1 wherein the onset layer has a $[10\bar{1}0]$ or a $[11\bar{2}0]$ preferred orientation.

13. The disk of claim 1 wherein the onset layer is from 20 to 50 angstroms in thickness and is thinner than the magnetic layer.

14. The disk of claim 1 wherein the second material is CoPtCrTa and the third material is CoPtCrB.

15. The disk of claim 14 further comprising a glass substrate and a NiAl seed layer deposited onto the substrate beneath the underlayer.

16. The disk of claim 14 further comprising a glass substrate and a Ta seed layer deposited onto the substrate beneath the underlayer.

17. A disk drive comprising:

a spindle;

a motor for rotating the spindle; and a thin film magnetic disk mounted on the spindle, the disk comprising:

a seed layer of NiAl or FeAl;

a nonmagnetic underlayer of a first material deposited on the seed layer, a ferromagnetic onset layer, deposited on the underlayer, of a second material with an hexagonal closed packed crystallographic structure, a ferromagnetic layer of a third material, with an hexagonal closed packed crystallographic structure, comprising cobalt and boron deposited on the ferromagnetic onset layer.

18. The disk drive of claim 17 wherein the first material includes from 10 to 23 at. % chromium; the second material comprises cobalt and chromium and the third material further comprises chromium and platinum.

19. The disk drive of claim 18 wherein the third material further comprises 4 to 12 at. % platinum, 10 to 23 at. % chromium and 2 to 10 at. % boron with the rest being cobalt.

20. The disk drive of claim 17 wherein the second material is a ferromagnetic alloy including cobalt, chromium and tantalum and the third material further includes chromium and platinum.

21. The disk drive of claim 1 further comprising a nonmetallic substrate and a seed layer deposited on the substrate beneath the underlayer and wherein the seed layer comprises NiAl or FeAl or Ta.

22. The disk drive of claim 17 the disk further comprising:

a nonmetallic substrate;

a seed layer deposited on the substrate with the seed layer being beneath the underlayer; and wherein:

the first material includes chromium;

the second material includes cobalt and chromium;

the third material comprises 4 to 12 at. % platinum, 10 to 23 at. % chromium and 2 to 10 at. % boron with the rest being cobalt;

the onset layer and the ferromagnetic layer have a $[10\bar{1}0]$ preferred orientation; and a thickness of the onset layer is less than 33% of a thickness of the ferromagnetic layer.

23. The disk drive of claim 17 wherein the onset layer is from 20 to 50 angstroms in thickness and is thinner than the magnetic layer.

* * * * *